US012559375B2

(12) United States Patent
Brito Lopes et al.

(10) Patent No.: US 12,559,375 B2
(45) Date of Patent: Feb. 24, 2026

(54) CONTINUOUS PRODUCTION OF CLATHRATE HYDRATES FROM AQUEOUS AND HYDRATE-FORMING STREAMS, METHODS AND USES THEREOF

(71) Applicant: PETROGAL, S.A., Alcântara (PT)

(72) Inventors: José Carlos Brito Lopes, Oporto (PT); Madalena Maria Gomes De Queiroz Dias, Oporto (PT); Marcelo Filipe Dos Santos Costa, Santiago Da Riba-Ul (PT); Carlos André De Moura Teixeira, Oporto (PT); Ricardo Jorge Nogueira Dos Santos, São Mamede De Infesta (PT)

(73) Assignee: PETROGAL, S.A., Alcântara (PT)

( * ) Notice: Subject to any disclaimer, the term of this patent is extended or adjusted under 35 U.S.C. 154(b) by 775 days.

(21) Appl. No.: 17/786,968

(22) PCT Filed: Dec. 30, 2020

(86) PCT No.: PCT/IB2020/062552
§ 371 (c)(1),
(2) Date: Jun. 17, 2022

(87) PCT Pub. No.: WO2021/137176
PCT Pub. Date: Jul. 8, 2021

(65) Prior Publication Data
US 2023/0040153 A1      Feb. 9, 2023

(30) Foreign Application Priority Data

Dec. 30, 2019    (PT) .......................................... 116038
Dec. 31, 2019    (EP) ..................................... 19220274

(51) Int. Cl.
| | |
|---|---|
| *C01B 32/55* | (2017.01) |
| *B01D 53/14* | (2006.01) |
| *B01D 53/62* | (2006.01) |
| *B01D 53/78* | (2006.01) |
| *B01F 25/452* | (2022.01) |

(52) U.S. Cl.
CPC .......... *C01B 32/55* (2017.08); *B01D 53/1475* (2013.01); *B01D 53/1493* (2013.01); *B01D 53/62* (2013.01); *B01D 53/78* (2013.01); *B01F 25/4522* (2022.01); *B01D 2252/103* (2013.01); *B01D 2257/504* (2013.01); *B01D 2258/0283* (2013.01); *C01P 2002/72* (2013.01)

(58) Field of Classification Search
CPC ..... C01B 32/55; C01B 32/50; B01F 25/4522; B01D 53/1475; B01D 53/1493; B01D 53/62; B01D 53/78; B01D 2252/103; B01D 2257/504; B01D 2258/0283; C01P 2002/72

See application file for complete search history.

(56) References Cited

U.S. PATENT DOCUMENTS

| | | | | |
|---|---|---|---|---|
| 5,434,330 | A | * | 7/1995 | Hnatow .................... C10L 3/10 |
| | | | | 422/162 |
| 5,536,893 | A | | 7/1996 | Gudmundsson |
| 5,562,891 | A | | 10/1996 | Spencer et al. |
| 6,028,234 | A | | 2/2000 | Heinemann et al. |
| 6,180,843 | B1 | | 1/2001 | Heinemann et al. |
| 6,576,276 | B1 | | 6/2003 | Gupta et al. |
| 6,653,516 | B1 | | 11/2003 | Yoshikawa et al. |
| 7,128,777 | B2 | | 10/2006 | Spencer |
| 2004/0143145 | A1 | | 7/2004 | Servio et al. |
| 2009/0126274 | A1 | * | 5/2009 | Vogel ......................... C05F 3/00 |
| | | | | 48/127.5 |
| 2011/0064643 | A1 | * | 3/2011 | Lee .......................... C10L 5/363 |
| | | | | 422/162 |
| 2013/0012751 | A1 | * | 1/2013 | Turner .................... C07C 7/152 |
| | | | | 585/868 |
| 2013/0158306 | A1 | | 6/2013 | Song et al. |
| 2014/0335002 | A1 | * | 11/2014 | Northrop ........... B01D 53/1462 |
| | | | | 166/305.1 |

FOREIGN PATENT DOCUMENTS

| | | |
|---|---|---|
| CN | 110404492 A | 11/2019 |
| JP | 2011244728 A | 12/2011 |

OTHER PUBLICATIONS

International Search Report and Written Opinion in corresponding PCT Application No. PCT/IB2020/062552 (11 pages).

* cited by examiner

*Primary Examiner* — Stuart L Hendrickson
(74) *Attorney, Agent, or Firm* — Leason Ellis LLP

(57) ABSTRACT

The present disclosure relates to a novel improved method for continuous crystallization of highly crystalline clathrate hydrates. The novel improved method utilizes a novel hydrator capable of overcoming heat and mass transfer limitations that usually constrain crystallization rate and thus reduces process productivity. The disclosed method and hydrator are for production of crystalline clathrates in general, $CO_2$ capture, capture of other clathrate forming compounds, $CO_2$ storage and transportation, storage and transportation of any clathrate forming compound in a solid lattice, gas separation or water desalination or purification purposes.

13 Claims, 6 Drawing Sheets

CONTINUOUS PRODUCTION OF CLATHRATE HYDRATES FROM AQUEOUS AND HYDRATE-FORMING STREAMS, METHODS AND USES THEREOF

CROSS-REFERENCE TO RELATED APPLICATIONS

This application is a U.S. National Stage Application under 35 U.S.C. § 371 of International Patent Application No. PCT/IB2020/062552, filed Dec. 30, 2020, which claims priority to Portugal Patent Application No. 116038, filed Dec. 30, 2019 and EP Application Serial No. 19220274.5, filed Dec. 31, 2019, the contents of which are each hereby incorporated by reference in their respective entireties.

TECHNICAL FIELD

The present disclosure relates to a novel improved method for continuous crystallization of highly crystalline clathrate hydrates. The present disclosure also relates to a hydrator for use in the method disclosed.

The disclosed method and hydrator are for production of crystalline clathrates in general, $CO_2$ capture, capture of other clathrate forming compounds, $CO_2$ storage and transportation, storage and transportation of any clathrate forming compound in a solid lattice, gas separation or water desalination or purification purposes.

BACKGROUND

Clathrate hydrates are crystalline compounds formed by highly organized three-dimensional lattice of water molecules physically bonded through hydrogen bonds, forming crystals that contain cages where guest molecules penetrate, thus stabilizing the network. These compounds usually crystallize in three different spatial arrangements, two cubic structures (sI and sII) and one hexagonal structure (sH). The difference between them lies in the number of different types of cages and their cavity size. Depending on the size and properties of the guest hydrate-forming compound, one of these three structures is formed.

Guest hydrate-forming compounds comprise, small gaseous hydrocarbon molecules from C1 to C5, and other light gases such as $N_2$, $CO_2$, CO, $H_2$ or $H_2S$. Clathrate hydrates or gas hydrates crystallize when water and a guest hydrate-forming compound, usually a gas, or a mixture containing at least one hydrate-forming compound, are in contact with each other, at conditions of low temperature and high pressure. The process can be conceptualized through the following reaction:

$$G + nH_2O \rightleftharpoons G \cdot nH_2O \downarrow + Heat$$

where G is the guest hydrate-forming compound, n is the water molecules to guest molecules ratio, also known as hydration number, and Heat is a term that represents the amount of heat that is released during the hydration process. The amount of heat released during the hydration process usually range from 50 kJ·mol$^{-1}$ to 120 kJ·mol$^{-1}$, depending on the thermodynamic conditions, crystalline structure, gas nature and composition. If hydration heat is not removed from the medium at a rate that is adequately high, the temperature of the system will increase up to a point at which the hydrates become thermodynamically unstable, and the crystallization process is hindered thus resulting in lower productivity or longer reaction times. This inhibition phenomena must be avoided for industrial implementation.

The crystallization of clathrate hydrates involves an extremely complex physical mechanism. When the hydrate-forming compound is a gas, when in contact with water, it is transferred from the gas phase to the liquid aqueous phase in a process known as dissolution. This process happens at the interface between gas and liquid. Therefore, the rate of dissolution is proportional to the rate of interfacial area generation. As the gas is being dissolved in water, heat is being released at the same time since dissolution is an exothermic process. If the heat is inefficiently removed, the temperature of the medium increases and the dissolution rate decreases. Clathrate hydrates can only crystallize if the temperature and pressure conditions are within the thermodynamic stability range, and if the aqueous medium is supersaturated, i.e., the amount of guest hydrate-forming compound in contact with water is larger than the capacity of water to dissolve the compound. These conditions are necessary but not sufficient. Crystallization of hydrates only occurs if hydrate nuclei/seeds are dispersed in the aqueous medium. Nuclei nucleation can be spontaneous, often due to strong molecule interactions and shocks induced by strong agitation. If supersaturation condition is met, and the system has enough energy to promote nucleation, clathrate hydrates will crystallize in the aqueous phase. The rate of hydrates crystallization is proportional not only to the supersaturation degree, but also to the rate of interfacial generation between vapour or liquid and water in the bulk of the aqueous solution. Thus, interfacial area must be as large as possible to speed up the process of crystallization. Thereafter, the hydrate-forming compound must diffuse through the initially crystallized hydrate layer and around the guest-water contact surfaces to form a bulky crystal that is macroscopically similar to ice. Since the hydration process is exothermic, heat is being released at the same time. Similar to the dissolution process, an inefficient removal of heat during the crystallization process results in decrease in hydration rates, ultimately resulting in complete inhibition. As such, it is important to ensure sufficiently high heat and mass transfer rates throughout the whole crystallization process.

Several methods for producing clathrate hydrates are known. Many of them aim to increase heat and mass transfer rates between gas/liquid and aqueous phase in order to increase the overall productivity of the crystallization process. These methods include the use of moving surfaces (U.S. Pat. No. 6,028,234A), the use of fluidized or expanded reaction beds (U.S. Pat. No. 6,180,843B1), or spraying gas-saturated water into vessels (U.S. Pat. No. 6,653,516B1), operating complex apparatus with moving parts to improve mixing and enhance transfer rates. Existing inventions aim to increase heat and mass transfer rates through dispersion of water or gas in the continuous phase, thus increasing interfacial surface area.

Document U.S. Pat. No. 6,028,234 discloses the use of spray nozzles for water and/or gas dispersion to promote hydrate formation in a moving surface inside a rotating drum.

Documents U.S. Pat. Nos. 5,536,893 and 6,180,843 disclose the use of atomizers or spray nozzles in a fluidized and/or expanded reaction bed to disperse water droplets downward while gas is being introduced.

Document U.S. Pat. No. 6,576,276B1 discloses mechanical agitation using paddles or ultrasonic devices to promote mixing and increase transport rates.

The methods described above often fail to efficiently remove hydration heat thus resulting in long process time and low productivity. Moreover, due to the complexity of the mass transfer mechanisms involved in the process, some methods may include extra precursor steps to remove the water saturation (dissolution) step to accelerate the process (U.S. Pat. No. 5,562,891A). Moreover, the methods above do not enable continuous production at rates required for the process industrial implementation.

Clathrate hydrates have gained special attention over the last few years due to their potential application in a vast number of areas such as $CO_2$ storage and transportation, gas separation and/or water desalination. There is therefore a need for an improved method that allows continuous clathrate hydrate crystallization.

These facts are disclosed in order to illustrate the technical problem addressed by the present disclosure.

General Description

The present disclosure relates to a novel improved method for continuous crystallization of highly crystalline clathrate hydrates. The novel improved method utilizes a novel hydrator capable of overcoming heat and mass transfer limitations that usually constrain crystallization rate and thus reduces process productivity.

In an embodiment, the interfacial area between aqueous and gaseous or liquid phase that contains the hydrate-forming compound is generated inside bidimensional meso/micro structured network plates thus not requiring atomizers, spray nozzles, or moving parts such as stirrers or rotors; preferably a plate reactor; more preferably a Netmix reactor.

A plate reactor is a reactor where one or more physico-chemical processes are carried out within regions delimited by successive plates contained within a stack of plates. Plate reactors comprising structured network flow plates, in a particular embodiment also known as "NETmix", are for example advantageous in enabling simplified bidimensional shapes suitable for most mixing and reacting processes, in providing high contact surfaces, in having a high capability to extract heat and/or sustain pressure, and also in providing a simple and effective structure which is straightforwardly obtained by stacking successive plates.

In an embodiment, a gas stream containing at least one hydrate-forming compound is mixed with an aqueous stream inside a hydrator comprising meso/micro mixing flow structured network plates and heat exchange plates, thus producing an aqueous slurry of aggregates of polymorph and nanocrystalline solid hydrates.

In an embodiment, a hydrator for use in the present disclosed method is capable of efficiently remove large quantities of heat released during the hydration process, enabling stable continuous crystallization process over a narrow gap of operational temperatures and pressure. The temperature range is from 0° C. to 5° C. and the pressure range is from 10 to 60 bar.

In an embodiment, the hydrator's network and heat exchange plates are designed and assembled to promote high heat transfer rates from the inside of the network plates, keeping the process temperature within the range where hydration occur. Temperatures above said range hinders the crystallization of hydrates while lower temperatures leading to formation of ice. The present method overcomes heat and mass transfer limitations of existing state-of-the-art by maintaining high gas dissolution and hydration rates without the need of additional precursor steps or mechanical stirring devices. The method thus efficiently reduces energy consumption and equipment sizes.

The disclosed method and hydrator allow the capture, storage and transportation of $CO_2$, gas separation, water desalination or purification.

The present disclosure relates to a method for addressing the technical difficulties in the continuous production of hydrates mentioned above by using an improved method for efficient crystallization of clathrate hydrates in a continuous process. It is therefore an object of the present disclosure to provide a method with improved mixing as well as heat and mass transfer rates through the use of a novel hydrator, whose design is also disclosed in the present disclosure. The disclosed hydrator allows enhanced rate of formation of hydrates without the need for any movable parts/devices. The disclosed method also promotes crystallization of polymorph and nanocrystalline clathrate hydrates in an aqueous slurry.

The method of the present disclosure can be easily scaled up from laboratorial to industrial scale without compromising its intrinsic properties such as mixing intensity, heat and mass transfer rates, rate of formation of hydrates, and overall productivity.

In an embodiment, the method for continuous crystallization of clathrate hydrates comprises the following steps:

Decreasing the temperature of an aqueous stream;

Adding the aqueous stream into the hydrator;

Adding a stream comprising at least one hydrate-forming compound into the hydrator to allow the hydrate-forming compound to come into contact with the aqueous stream at adequate pressure and temperature conditions;

Collecting the aqueous hydrate slurry from the outlet of the hydrator.

Further steps may be required depending on the final application of the method of the present invention, including concentration of the hydrate crystals or gasification of the crystalline hydrates.

In an embodiment, to improve productivity of the method of the present disclosure aqueous and hydrate-forming streams can be recycled.

In an embodiment, the aqueous stream may be any liquid solution containing water as the solvent and main compound. Said aqueous stream may contain only water, or also gases, salts, minerals, or other compounds such as tetrahydrofuran (THF) or tetra-n-butylammonium bromide (TBAB) to promote hydrates crystallization.

In an embodiment, the hydrate-forming stream may comprise any hydrate-forming mixture, including a single-component compound, or mixtures thereof containing at least one hydrate-forming compound. The hydrate-forming compound is usually a gas, selected from the following list of molecules with molecular radii less than 9 Å: carbon dioxide, carbon monoxide, hydrogen, nitrogen, C1-C5 hydrocarbons, hydrogen sulphide, or mixtures thereof.

In an embodiment, the crystallization process occurs inside the hydrator, at the interface where the aqueous and hydrate-forming streams come into contact with each other. Surprisingly at the conditions of the present disclosure the mixing between aqueous and hydrate-forming phases is sufficiently intense to generate interfacial surface area at high rates, to enhance guest hydrate-forming dissolution rates in aqueous phase, to promote hydrate crystals nucleation and to enhance heat transfer rates from the guest-aqueous contacting medium.

In an embodiment, the hydrator is built by stacking several plates comprising at least (a) meso/micro structured network plates, and (b) heat exchange plates. Aqueous and hydrate-forming stream come into contact with each other in the meso/micro structured network plates where crystallization of hydrates occurs. The interior of the structured network plates is subjected to low temperature and high-pressure conditions. The temperature and pressure are within the thermodynamic stability range for crystallization of clathrate hydrates to occur. Specific conditions chosen will depend on the composition of the gaseous stream but temperatures ranges from 0° C. to 10° C. and pressure ranges from 10 to 60 bar.

In an embodiment, temperatures range from 0° C. to 5° C. and pressure range from 20 to 50 bar. The temperature inside the structure network plates is set by decreasing the temperature of the aqueous stream prior to its entrance into the network plates since it is the stream with larger thermal inertia. Additionally, heat exchange plates keep the temperatures within the range of operational temperatures. To stimulate the process, the temperature of the hydrate-forming stream is kept low, ranging from 0° C. to 10° C. if the hydrate-forming guest is a liquid, and from 0° C. to 25° C. if the hydrate-forming guest is a gas. Pressure inside the structured network plates is controlled by the pressure of aqueous and hydrate-forming streams at the inlet of said plates. In particular, aqueous and hydrate-forming streams have similar pressures at the inlet of the hydrator thus ensuring proper fluid distribution along the structured network plates.

As a consequence of the crystallization process, heat is released and is transferred to the heat exchange plates. The heat exchange plates enable the flow of a cold fluid, such as a refrigerant, inside the hydrator at a temperature lower than the temperature of the bulk of the structured network plates. This absorbs the hydration heat from the crystallization process.

In an embodiment, the meso/micro structured network plates may be a carved network of static mixing elements comprising of cylindrical chambers connected to each other in a bidimensional array through prismatic channels. The size of the network in both directions can be changed easily by increasing or decreasing the number of columns and rows that are part of the network, thus enabling easy upscaling of the hydrator in terms of production rates and enclathration efficiency, without affecting the mixing properties of the network. Said properties are promoted by the impingement on each other of the high energy jets that enter in each chamber through at least two inlet channels, thus promoting strong flow instabilities and vortices, resulting in a chaotic and oscillatory flow regime that enhances mixing intensity and heat and mass transfer mechanisms. In particular, instabilities caused by multiphase flow in such network results in interfacial shear stresses that lead to a significant increase in interfacial surface area. The network in the structured network plates is fed through a number of inlet channels directly connected to the chambers of the first row. The number of inlet channels is equal to the number of columns in the network. Said inlet channels may be connected in the same direction or perpendicular to the direction of the flow of the streams. Aqueous and hydrate-forming streams are fed into the network through these inlet channels. Distribution plates may be required in the hydrator to distribute the aqueous and hydrate-forming streams into multiple inlets to feed the inlet channels of the network. The resulting aqueous slurry of hydrates is removed from the network through the outlet channels connected to the chambers in the last row of the network. Said outlet channels may be connected in the same direction or perpendicular to the direction of the flow of the aqueous slurry of hydrates. The outlet channels may or may not converge into a smaller number of channels to transfer the aqueous slurry of hydrates to the exterior of the hydrator. Heat exchange plates are stacked adjacent to the structured network plates. Said heat exchange plates comprises static elements to improve fluid flow distribution and to maximize heat transfer capacity.

In an embodiment, heat exchange plates may contain channels and/or vertically mounted rods to promote flow distribution and to distribute compressive stresses resulting from high pressure conditions in the structured network plates along the whole network of the hydrator. The cooling fluid can be any refrigerant capable of flowing at temperatures ranging from –5° C. to 0° C. In particular, ethanol or glycol aqueous solutions, or combinations thereof.

In an embodiment, the number of meso/micro structured network plates and heat exchange plates forming a stack can be increased to scale up production rates, enabling the coupling of plates in parallel or series, as well as the increase or decrease of the number of plates in the stacking. Furthermore, the alternate stacking of high-pressure plates and low-pressure plates distributes the mechanical stresses along the direction perpendicular to the flow throughout all the plates. In this way, only the top and bottom plates require special attention regarding mechanical resistance to contain operational pressures. Additionally, the stacking of plates in which the flow is essentially bidimensional reduces the heat transfer resistance between the structured network plates and the heat exchange plates by reducing the distance between each stack of plates. The combination of the stacking of meso/micro structured network plates and heat exchange plates gives the hydrator the capability to efficiently and continuously crystallize hydrates into an aqueous slurry when the aqueous and hydrate-forming streams are allowed to come into contact for a gas-liquid contact time ranging from 0.1 to 10 seconds.

According to previous works from Costa M F, Fonte C M, Dias M M, Lopes J C B, Heat Transfer Performance of NETmix—A Novel Micro-Meso Structured Mixer and Reactor. AIChE J. 2017., the use of mesostructured network plates in the hydrator results in a heat removal capacity ranging from $10^7$ to $10^9$ Watt per Kelvin per cubic meter of network carved in the structured network plate. Furthermore, said structured network plate present very large specific surface area for heat transfer, ranging from $10^3$ to $10^4$ square meters of heat transfer area per cubic meter of network volume, which is at least two orders of magnitude larger than stirred tanks or tubular reactors. Considering a temperature difference of 5 Kelvin between the bulk of the fluids inside the structured network plate and the heat exchange plate, the heat dissipation capacity of the hydration ranges from 50 to 5000 megawatt per cubic meter of network. For the sake of comparison, specific heat transfer rates of other technologies such as stirred tank reactors with cooling jackets or serpentines are limited to 0.1 MW·m$^{-3}$, meaning that production rate of the other technologies is 5000 megawatt per cubic meter lower than the rate obtained by the method of the present disclosure. Temperature difference of 5 Kelvin is the recommended temperature difference required to operate the hydrator within the narrow range of operational temperatures. Moreover, the temperature difference should preferably not be large enough so that ice is not formed inside the structured network plates. In a particular embodiment, aqueous stream is constituted by fresh water and hydrate-forming stream is constituted by pure carbon dioxide. The hydration heat for the crystallization of $CO_2$ hydrates is about 60 kilojoules per mole of $CO_2$ molecules inside the hydrate crystals, or about 1400 kilojoules per kilogram of $CO_2$. This means that the hydrator described in the present disclosure is able to remove the heat released from the crystallization process of 40 kilograms to 4 tonnes of $CO_2$ per second per cubic meter of network.

In an embodiment, use of the hydrator allows continuous production of clathrate hydrates in the form of aqueous slurries with a solid content up to 30% in mass of hydrates, making it perfectly suitable for hydraulic transport without clogging up the hydrator or pipelines.

In an embodiment, aqueous hydrate slurry obtained using the disclosed method can be used for:

a) $CO_2$ storage and transportation through volume reduction of at least 60 times as compared to gas at normal and temperature conditions (NPT) conditions, thus significantly reducing transportation costs, and enabling $CO_2$ storage in high pressure and low temperature environments, such as in the ocean seabed;

b) Gas separation through selective and preferential capture of one gas over the remaining gases in the hydrate cages;

c) Water desalination and/or purification, as long as the contaminants present in the water are not hydrate-forming compounds since the hydrates are formed from pure water and guest hydrate-forming compound only.

In an embodiment, the present disclosure describes a method for producing clathrate hydrates in a continuous process comprising the following steps:

lowering the temperature of an aqueous solution stream to a pre-defined temperature range;

introducing the aqueous stream of solution into a hydrator via a first inlet;

introducing a stream of at least one hydrate-forming compound into the hydrator via a second inlet;

contacting the hydrate-forming stream and the aqueous stream inside a chamber of the hydrator for producing an aqueous slurry of clathrate hydrates, wherein the hydrator has an operational temperature ranging from 0° C. to 10° C., pressure ranging from 10 to 60 bar and, hydrate-forming stream rate ranging from 1 to 500 ton/h;

collecting the aqueous slurry of hydrates from an outlet of the hydrator.

By contacting the hydrate-forming stream and the aqueous stream inside a static mixing element at the conditions of the present disclosure, said mixing element surprisingly achieves a heat transfer rate above 50 MW/m³ and mass transfer between the phases in shorter periods than one second. The streams are progressively well mixed over a series of interconnected static mixing elements that are built in the structured plates (or a stack of a network mixer plate) of the hydrator for producing an aqueous slurry of clathrate hydrates.

In an embodiment, the method further comprises one of the following steps: concentrating the hydrate crystals; or gasification of the crystalline hydrates.

In an embodiment, the operational temperature of the hydrator ranges from 0° C. to 5° C., preferably 2-5° C.

In an embodiment, the pressure ranges from 20 to 50 bar, preferably 30-40 bar.

In an embodiment, the hydrate conversion rate is at least 80%.

In an embodiment, the aqueous solution stream and the hydrate-forming stream are introduced into the static mixing elements of the hydrator through high energy jets that enhances the mixing intensity of the hydrate-forming stream and the aqueous stream inside the chamber.

In an embodiment, the aqueous and hydrate-forming streams are introduced into the hydrator at a ratio of hydrate-forming compound:water mass flow rate of at least 5%, preferably from 10-30%.

In an embodiment, the hydrate-forming stream and the aqueous stream are mixed in a chamber of the hydrator at a Reynolds number of one of the inlet streams of at least 100 and local mixing times not more than 1 second.

In an embodiment, the hydrate-forming compound is selected from a list of molecules with molecular radii less than 9 Å comprising: carbon dioxide stream, carbon monoxide stream, hydrogen stream, nitrogen stream, C1-C5 hydrocarbons stream, hydrogen sulphide stream, or mixtures thereof.

In an embodiment, the C1-C5 hydrocarbons stream is methane, ethane, propane, or butane.

In an embodiment, the aqueous stream of solution contains other compounds, preferably salts, gases, organic promoters, or mixtures thereof.

In an embodiment, the hydrator is an array of static mixing elements comprising chambers, preferably a series of interconnected static mixing elements.

In an embodiment, the hydrator comprises:

a stack of a network mixer plate for performing the hydration and a heat exchange plate, wherein the network mixer plate comprises an array of static mixing elements comprising chambers, wherein each chamber being interconnected by at least two channels to at least two other chambers, for mixing and dividing one or more flow stream sequentially through said chambers, wherein the heat exchange plate comprises one or an assemble of channels, preferably having an array of vertically mounted rods, for the flow of a cooling liquid, wherein the channel of the heat exchanger plate and the chambers of the network mixer plate are lined up to transfer heat between said chambers and said channel, wherein each chamber of the network mixer plate is a spherical or cylindrical chamber, comprising at least two or three channels and at least two or three apertures for connection to said channels, wherein the temperature of the cooling liquid ranges from −5° C. to 0° C.

In an embodiment, the heat transfer coefficients of the hydrator range from 1000 to 8000 W·m⁻²·k⁻¹, preferably range from 4000 to 8000 W·m⁻²·k⁻¹.

In an embodiment, the method is for use in capturing of gas, storing of gas, transportation of gas, gas separation, water desalination, or water purification.

In an embodiment, a crystalline hydrate of $CO_2$ is obtained by the method described above, wherein the crystalline $CO_2$ hydrate form has any one or more of the following:

an XRD pattern comprising peaks at diffraction angles (2θ) of 18.2°±0.5%, 29.9°±0.5%, 30.8°±0.5% and 31.7°±0.5%;

an XRD pattern essentially the same as shown in FIG. 6 having a melting point ranging from −50° C. and −40° C.

In an embodiment, the crystalline of $CO_2$ hydrate obtained by the method of the present disclosure has the absence of peaks at diffraction angles (2θ) of 22.5±0.5%, 24.1±0.5% and 40±0.5%, this data also shows the absence of hexagonal ice (see FIG. 6).

In an embodiment, the $CO_2$ crystalline hydrate melting point can be obtained by several measurement methods, in the present disclosure the method used was differential calorimetry.

BRIEF DESCRIPTION OF THE DRAWINGS

The following figures provide preferred embodiments for illustrating the description and should not be seen as limiting the scope of invention.

DETAILED DESCRIPTION

Figure 1:
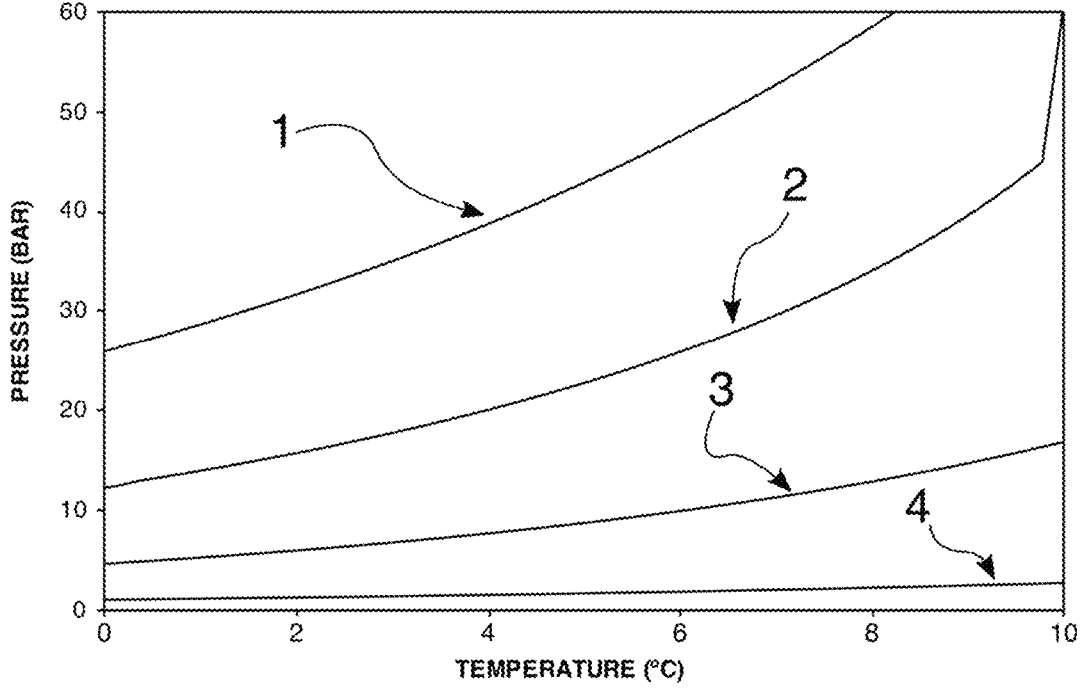
FIG. 1 shows a phase diagram of the operational conditions established for water and several hydrate-forming compounds such as: (1) methane $CH_4$, (2) carbon dioxide $CO_2$, (3) ethane $C_2H_6$ and (4) hydrogen sulphide $H_2S$.

The present disclosure relates to a novel improved method for continuous crystallization of highly crystalline clathrate hydrates. The novel improved method utilizes a novel hydrator capable of overcoming heat and mass transfer limitations that usually constrain crystallization rate and thus reduces process productivity.

As explained above, current methods for crystallization of hydrates either fail to do it continuously or present a series of problems regarding process stability due to inadequate heat and mass transfer rates for operating within the pressure and temperature conditions suited for crystallization to occur. Therefore, there is a need for an improved method.

The present disclosure relates to a novel improved method for efficient crystallization of clathrate hydrates in a continuous process. The novel improved method utilizes a novel hydrator capable of overcoming heat and mass transfer limitations that usually constrain crystallization rate and reduces process productivity.

In an embodiment, the method maximizes the rate of conversion of gas to hydrates through conditions that allows the method of the present disclosure to achieve close to the thermodynamic equilibrium conditions thus minimizing energy consumption.

In an embodiment, the method is carried out in a hydrator built by stacking at least two types of plates: meso/micro structured plates comprising a network of static mixing elements, where the crystallization occurs and where hydration heat is released; and heat exchange plates that absorb hydration heat from the structured network plates thus keeping its temperature within the range of operational temperatures. Due to the lack of any movable parts in the hydrator to promote mixing such as stirrers and other mechanical agitators, solely energy to the flow of the fluid streams is required in the hydrator.

In an embodiment, the hydrator comprises plates in which an aqueous stream and a hydrate-forming stream are fed into the hydrator through the meso/micro structured plates. The aqueous and hydrate-forming streams form hydrates of the hydrate-forming compounds in which a lattice of water molecules surrounds and traps the hydrate-forming molecules inside, forming polymorphic crystals of hydrates suspended in water in a slurry. Both the crystallization process and the guest hydrate-forming dissolution process (to achieve supersaturation) are exothermic, as such a cooling fluid must be fed to the heat exchange plates to absorb the heat released in the structured network plates.

In an embodiment, the method for the continuous crystallization of clathrate hydrates comprises the following steps:

Decreasing of the temperature of an aqueous stream;

Adding the aqueous stream into the hydrator;

Adding a stream comprising at least one hydrate-forming compound into the hydrator to allow the hydrate-forming compound to come into contact with the aqueous stream, at pressure and temperature conditions within thermodynamic stability region;

Collecting the aqueous hydrate slurry from the outlet of the hydrator.

In an embodiment, the aqueous stream may be fresh water or an aqueous solution. The aqueous solution can also contain salts, gases, or other compounds. The temperature of the aqueous stream is decreased by passing this stream through the hot side of a conventional heat exchanging device, such as a shell-and-tube heat exchanger or plates heat exchanger. A refrigerant enters the cold side of said heat exchanging device. The refrigerant can be any refrigerant capable of lowering the temperature of the aqueous stream down to the operational temperature. If operating in countercurrent, the inlet temperature of the refrigerant must be lower than the outlet temperature of the aqueous stream, and the inlet temperature of the aqueous stream must be larger than the outlet temperature of the refrigerant. If operating in co-current, the inlet temperature of the refrigerant must be lower than the inlet temperature of the aqueous stream, and the outlet temperature of the aqueous stream must be larger than the outlet temperature of the refrigerant.

In an embodiment, the heat exchange operates counter-currently for a more efficient operation. The aqueous stream is then pumped into the hydrator at the operational pressure conditions, using a conventional centrifugal pump or positive displacement pumps such as diaphragm pump or screw pump. If pump dissipation results in the temperature of the aqueous stream increasing to a temperature that is outside the range of operational temperatures, then pumping should be done prior to cooling the aqueous stream.

In an embodiment, the hydrate-forming stream is a single-component gas, $CO_2$, or a mixture of gases, such as $CO_2$ and $N_2$. Other suitable hydrate forming compounds or mixtures thereof include compounds with molecular radii less than 9 Å comprising C1-C5 hydrocarbons, carbon monoxide, hydrogen, hydrogen sulphide, amongst others.

In an embodiment, the hydrate-forming stream is introduced into the hydrator at a rate that allows supersaturation. Typically, for highly soluble gases such as carbon dioxide, the gas:water mass flow rate ratio is at least 5%. The maximum bound is limited by the desired amount of hydrates dispersed in the slurry.

In an embodiment, the volume concentration of the hydrates in the slurry is not more than 40%. The gaseous stream may or may not be cooled down to the hydrator's operational temperature. If the hydrate-forming stream is at room temperature, the lower thermal inertia from the hydrate-forming stream enables the exchange of sensible heat with the aqueous stream without decreasing the temperature inside the hydrator at values that enable ice formation. The hydrate-forming stream must be introduced into the hydrator at a similar pressure than the aqueous stream. If the hydrate-forming stream is at a lower pressure, compression in a single stage or in multiple stages is required. If compression is required, the hydrate-forming stream is also cooled. If the hydrate-forming stream is available at temperatures larger than 25° C., the hydrate-forming stream is also cooled. Conventional heat exchangers, operating in co-current or counter-current, can be used for cooling the hydrate-forming stream. The same conditions for the refrigerant for cooling the aqueous stream is applied for the cooling of the gaseous stream.

In an embodiment, the hydrates are formed using the stacked micro/meso structured plates and heat exchange plates, and a closing mechanism to contain pressure and eliminate the possibility of inter-plate leakages. The hydrator may or may not comprise additional plates for fluids distribution in the networks structured plates and heat exchange plates, or for thermal insulation.

Figure 2:
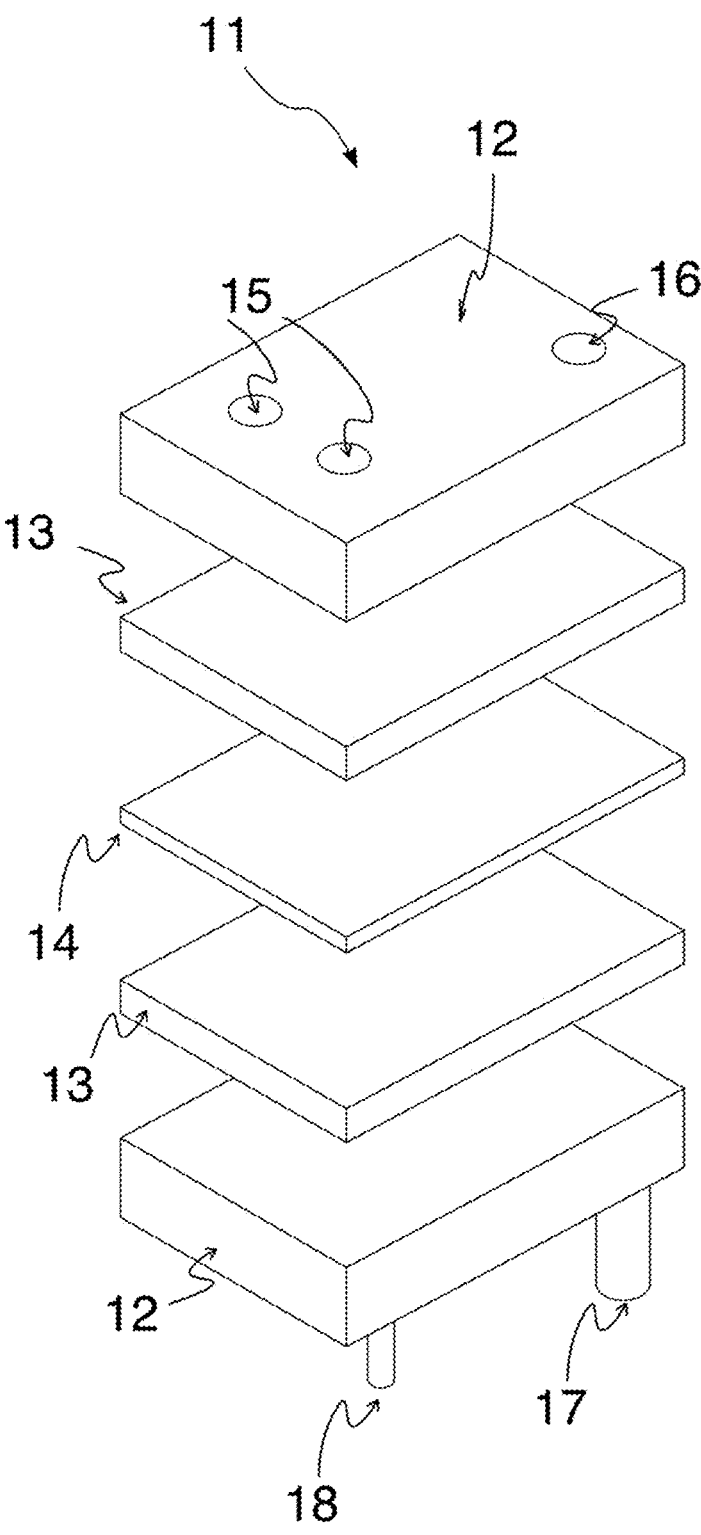
FIG. 2 shows the stacking of the plates of the (11) hydrator for continuous crystallization of clathrate hydrates comprising: (13) two heat exchange plates, (14) one structured network plate and (12) two closing plates.

In an embodiment, as FIG. 2 illustrates, the hydrator comprises stacking of plates. The embodiment from FIG. 2 comprises a stacking of plates (11), delimited by closing plates (12) for compression, and two heat exchange plates (13) intercalated by one network plate (14). The closing plates are required to withstand the mechanical stresses due to the high pressure in the structured network plates. The top closing plate comprises inlets for the hydrate-forming and aqueous liquid streams (15), and one or more inlets for the refrigerant (16). The bottom closing plate comprises outlet for the flow of aqueous slurry (17) of hydrates, and one or more outlets for the flow of refrigerant (18). In FIG. 2, the refrigerant is flowing in co-current with the gaseous and aqueous streams. The structured network plates contain static mixing elements to promote mixing, to enhance heat and mass transfer rates, and to promote and accelerate hydrates crystallization.

Figure 3:
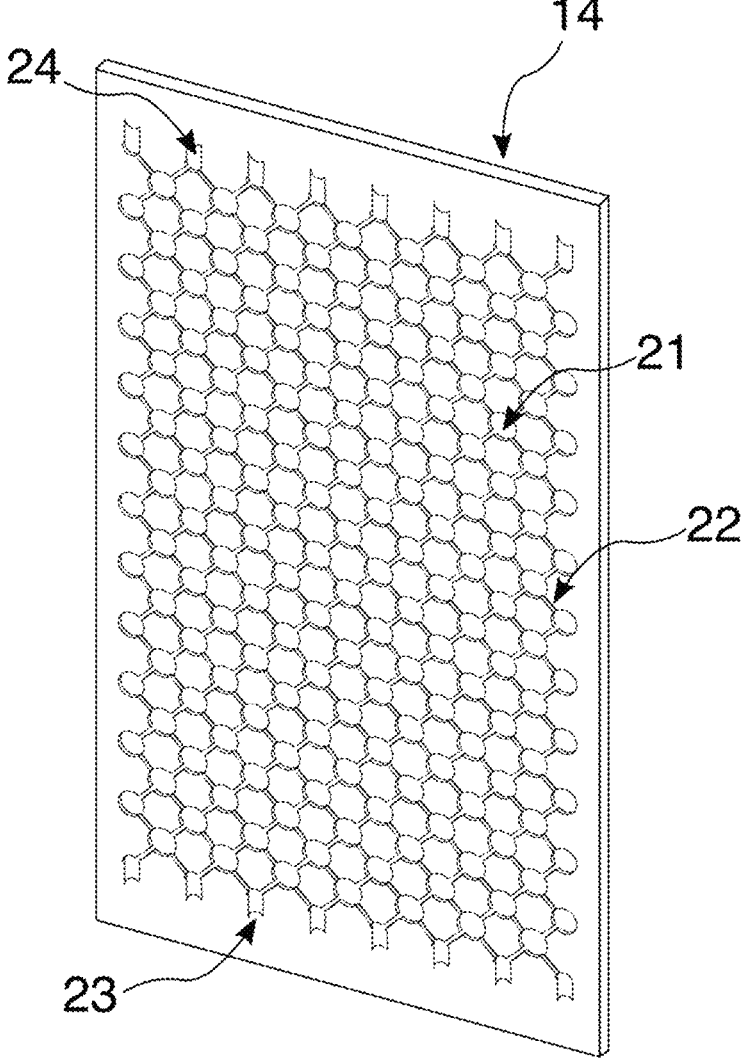
FIG. 3 shows the mesa/micro structured network plate comprising a carved network of (21) cylindrical chambers, (22) prismatic channels, (23 and 24) inlet and outlet channels.

In an embodiment, as illustrated in FIG. 3, the static mixing elements can be a network of cylindrical channels and prismatic chambers connected to each other in a bidimensional network, carved into the plates. The plates are made from a mechanically resistant material such as stainless steel or other metallic alloys. The network of chambers and channels are characterized by the number of rows $n_x$ in the direction of the flow, and number of columns $n_y$ in the direction normal to the flow. In the embodiment illustrated in FIG. 3, the number of rows $n_x$ is 25 and the number of columns $n_y$ is 8. The size of the network in both directions is easily adaptable by increasing or decreasing the number of chambers and channels, i.e., increasing or decreasing the number of rows and columns. This versatility allows a precise control of the contact time between guest hydrate-forming and liquid, as well as in terms of productivity, without affecting the mixing properties of the network. The chambers are characterized by a characteristic diameter Dc, and the channels are characterized by a width d, a length I and a depth ω. The depth of the channels and chambers is the same and is equal to ω.

In an embodiment, to maximize the mixing intensity in the chambers of the structured network, the ratio of the chamber diameter to the channel width is preferably 6 to 7. The ratio of the channel width to the channel depth should preferably be as high as possible, preferably 2 to 5. The mixing properties inside the chambers of the meso/micro structured network is due to the high energy jets from the two inlet channels of each chamber. The high energy jets impinge upon the chambers, promoting flow instability with periodic and chaotic characteristics that results in an intense mixing. However, there is a minimum amount of energy that the jets preferably possess in order to promote mixing. This energy is characterized by the channel's Reynolds number, defined as $Re=\rho vd/\mu$, where $\rho$ and $\mu$ are the fluids density and viscosity, respectively, $v$ is the velocity in the channel, and d is the channel's hydraulic diameter. For better results, the Reynolds number Re is larger than 100, preferably larger than 150. In addition to intense mixing, operating at these conditions of Reynolds number also have a positive impact on the increase of heat and interfacial mass transfer rates. In particular, instabilities caused by multiphase flow in such network results in interfacial shear stresses that lead to a significant increase of interfacial surface area. The network from FIG. 3 is built from repetition of cylindrical chambers (21), and prismatic channels (22). The aqueous stream and gaseous stream enter the network static mixer plates through inlet injection channels (23) that are connected to the mixing chambers of the first row of the network of said chambers and channels. The streams enter said network in different injection schemes, intercalated or not.

In an embodiment, as illustrated in FIG. 3, the network size is $n_x=25$ and $n_y=8$. The number of inlet channels is the same as the number of network columns $n_y$. Said inlet channels may be connected in the same direction or perpendicular to the direction of the flow. In FIG. 3, said inlet channels are oriented in the same direction as the flow. Moreover, aqueous and hydrate-forming streams can be premixed prior to entering the network static mixer plates, being its flow equally or not divided through the number of rows of the network of mixing chambers and channels. The aqueous slurry stream exits the network plates through similar injection channels (24) through $n_y$ channels.

In an embodiment, the heat exchange plates are stacked adjacent to the structured network plates. Several combinations of structured network plates and heat exchange plates can be used. For better results, one structured network plate is surrounded by one heat exchange plate on each side to maximize heat transfer rates. Heat exchange plates contain static elements to improve fluid flow distribution and to maximize heat transfer capacity.

In an embodiment, heat exchange plates comprise channels and/or vertically mounted rods to promote flow distribution and to distribute compressive stresses, caused by high pressure conditions in the structured network plates, along the whole stacking of the hydrator. A cooling fluid flows inside the heat exchange plates to absorb the heat released by the adjacent structured network plates during the crystallization of the hydrates. To maximize the heat transfer performance, temperature difference between the network plates is as large as possible. For better results, and to avoid freezing of the fluid inside the network plates, a temperature difference ranging from 2° C. to 5° C. is preferable. The cooling fluid enters the heat exchange plates at temperatures ranging from −5° C. to 0° C. The pressure of the cooling fluid is atmospheric plus the energy required for the cooling fluid to flow inside, i.e., pressure to overcome the pressure drop inside the heat exchange plates. The cooling fluid can be any refrigerant capable of flowing at temperatures ranging from −5° C. to 0° C., to operate with the temperature difference mentioned above. In particular, ethanol or glycol aqueous solutions, or a combination thereof, can be used. The refrigerant flow rate is set so that the temperature difference between the bulk of the heat exchange plates and the bulk of the structured network plates is constant. For better results, the flow rate is 5 to 20 times larger than the water flow rate in the structured network plates. Refrigerant and heat exchange geometry are chosen to obtain heat transfer coefficients ranging from 1000 to 8000 W·m$^{-2}$ k$^{-1}$, preferably in the range of 4000 to 8000 W·m$^{-2}$ k$^{-1}$.

In an embodiment, distribution or collecting plates may or may not be installed in the hydrator to distribute both aqueous and gaseous stream into multiple inlets to feed the inlet channels and the network, or to collect the produced slurry of hydrates into a single connection. These are installed at the top and beginning of the stacking.

In an embodiment, the hydrator also comprises a closing system to contain the pressure inside the structured network plates. The advantage of using a stacking of plates is that the inner pressures are distributed along the stack, hence pressure containment is only required at the top and bottom of the stacking.

The use of a stacking of meso/micro structured network plates and heat exchange plates makes it easier to scale up the process. The coupling of plates can be in parallel or series. The number of plates in the stack can be increased or decreased.

In an embodiment, a stream of aqueous slurry of poly-morphic and nanocrystalline hydrates is collected from the outlet of the hydrator. The temperatures and pressure conditions of this stream ranges from 0° C. to 5° C. and 10 to 30 bar respectively depending on the guest hydrate-forming and aqueous stream composition introduced at the inlet of the hydrator. Depending on the final application, the stream of aqueous slurry of hydrates obtained can be further processed or purified. Further processing of the aqueous slurry includes multi-step crystallization of hydrates, gas-liquid-solid separation, solid concentration, stream recycling or dissociation of the hydrates.

The disclosed method is used in several applications. The following examples are offered by way of illustration purposes only and not as a limitation.

Example 1: Continuous CO$_2$ Hydrates Production for Transportation

Figure 4:
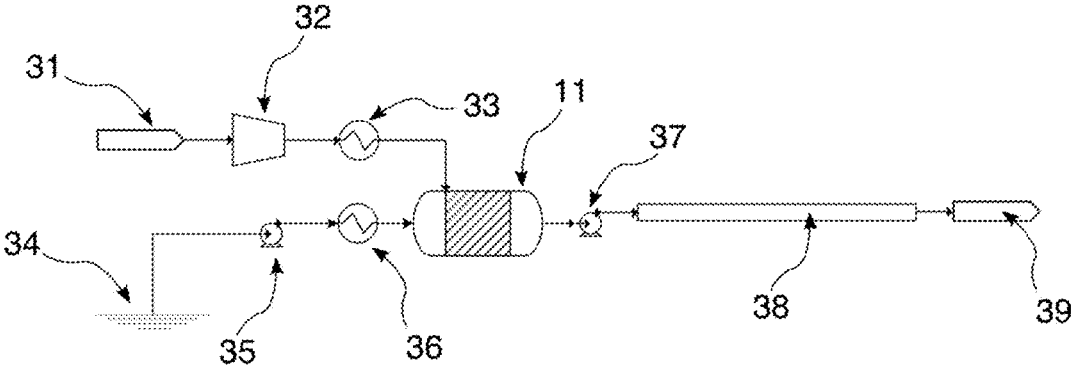
FIG. 4 is a process flow diagram for the method of sequestration and transport of $CO_2$ using the hydrator.

In an embodiment, after the hydrates are collected at the outlet of the hydrator, they can be transported into a storage site and deposited far from the atmosphere, in high pressure and low temperature environments such as the ocean seabed. FIG. 4 shows schematically the method of the present disclosed method for the continuous crystallization of an aqueous slurry of CO$_2$ hydrates, including the transport of the CO$_2$ hydrates through a pipeline to a storage site. In this process, the pure CO$_2$ stream (31) is pressurized in a multi-stage compressor (32) and then cooled in a shell-and-tube heat exchanger (33). The water stream (34) is pressurized using a centrifugal pump (35) and cooled using a second shell-and-tube heat exchanger (36). Both gaseous and aqueous streams are pressurized to a pressure ranging from 20 to 40 bar and cooled to a temperate ranging from 2° C. to 5° C. The gas-liquid mass flow rate ratio ranges from 10% to 15%. In this example, an aqueous solution of 30% in volume of ethylene glycol is used as refrigerant, entering the heat exchangers at a temperature ranging from –10° C. to –5° C. The streams are introduced into the hydrator (11) disclosed above. An aqueous slurry of CO$_2$ hydrates at a mass concentration ranging from 20% to –40% is obtained at the outlet of the hydrator. The heat released during the crystallization of hydrates and the heat from CO$_2$ dissolution in water are absorbed by the refrigerant flowing in the heat exchange plates of the hydrator. The refrigerant is an aqueous solution of 30% in volume of ethylene glycol, entering the hydrator at a temperature ranging from –5° C. to 0° C. The hydrates slurry is then pressurized using a pump (37)

and hydraulically transported through a pipeline (38) to a storage site where it is deposited (39). The pressure at which the hydrates are transported depends on the distance to the storage location. The pressure typically ranges from 60 to 70 bar for a storage site 100 kilometers from the production site. Alternatively, the use of pumps in several booster stations for long-distance transportation may be required.

Example 2: Continuous CO$_2$ Capture and Separation From Flue Gas

In an embodiment of the disclosed method of producing clathrate hydrates is for the capture of CO$_2$. CO$_2$ capture can be used for power plants or any other industrial processes where large amounts of CO$_2$ are produced. The clathrate hydrates can be used to separate CO$_2$ from the other gases.

Example 2 focuses on the process of capturing CO$_2$ from flue gas (a mixture of CO$_2$ and N$_2$). Both N$_2$ and CO$_2$ can produce hydrates, but they require different conditions. CO$_2$ forms hydrates at lower pressures than N$_2$, as such the clathrate hydrates produced by the disclosed method are CO$_2$-rich, resulting in a N$_2$-rich and cleaner gaseous stream output. The method is similar to that shown above, consisting of allowing the CO$_2$/N$_2$ mixture to come into contact with water under pressure and temperature conditions that lead to the formation of hydrates. The method further comprises separation steps after the clathrate hydrates production process.

Figure 5:
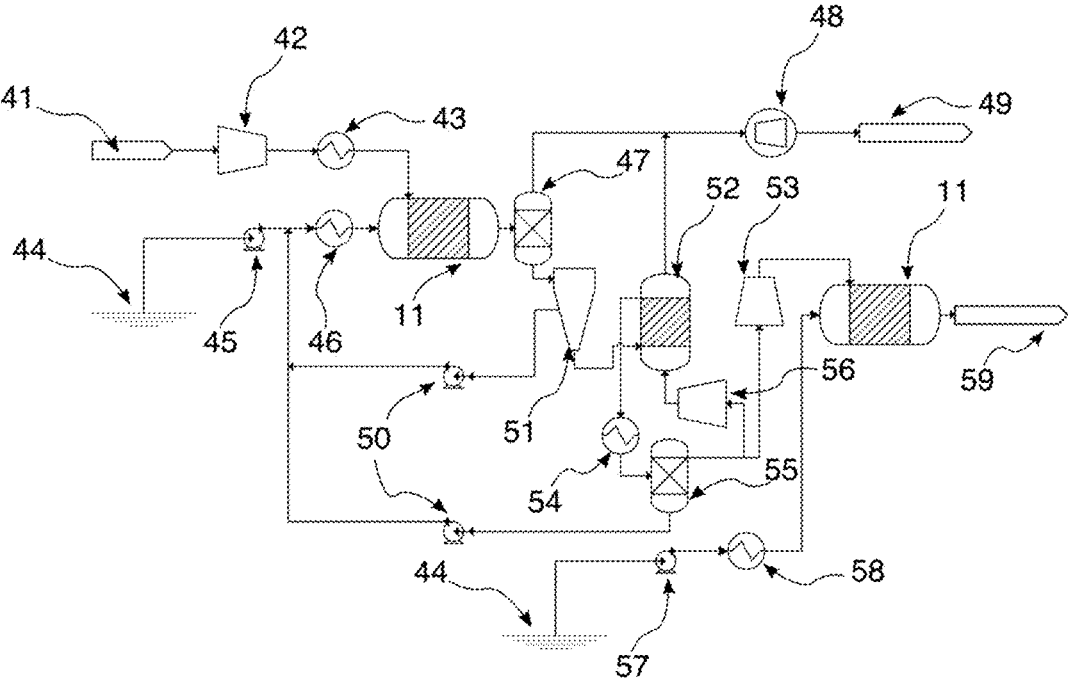
FIG. 5 is a process flow diagram of the method of purification and separation of a mixture of gases using the hydrator.

In an embodiment, FIG. 5 provides a schematic diagram of the hydrate-based CO$_2$ capture process for separating CO$_2$ from N$_2$. In the disclosed method, a stream composed of a mixture of CO$_2$ and N$_2$ (41), is pressurized to pressures between 5 and 40 bar in a multi-stage compressor (42), and is cooled in a shell-and-tube heat exchanger (43) down to temperatures in the range of 2° C. to 5° C. The concentration of CO$_2$ at the gaseous stream may be from 5% to 90% vol. The feed aqueous stream (44) is pressurized using a centrifugal pump (45), after it is mixed with an aqueous stream from two recycled streams. Tetrahydrofuran at concentration of about 1% mol is present in the feed aqueous stream to lower the equilibrium pressure for the gaseous mixture. The said stream is cooled using a shell-and-tube heat exchanger (46) to the same temperature and pressure as the stream (41). The gas-liquid mass flow rate ratio ranges from 5% to 20%. In this example, an aqueous solution of 30% in volume of ethylene glycol is used as refrigerant, entering the heat exchangers at a temperature ranging from –10° C. to –5° C. The streams are put in contact with each other inside the hydrator (11) described. The heat released during the crystallization of hydrates and during gas dissolution (mainly CO$_2$ gas dissolution) in water, is absorbed by the refrigerant flowing in the heat exchange plates of the hydrator. The refrigerant is also an aqueous solution of 30% in volume of ethylene glycol, entering the hydrator at a temperature ranging from –5° C. to 0° C. The N$_2$-rich vapour obtained at the outlet of the hydrator is further separated from the aqueous slurry in a flash drum separation unit (47). The gaseous phase exits from the top of the flash unit and passes through a turbine (48) which reduces the stream (49) pressure to atmospheric pressure thus enabling energy recovery. The gaseous phase is essentially composed of N$_2$. The output stream (49) is cleaner, containing lower CO$_2$ concentration than the feed stream (41). CO$_2$ concentration in the output stream (49) ranges from 0.1% to 5% vol. The aqueous slurry exits at the bottom of the flash unit (47) and undergoes a solid-liquid separation in a hydrocyclone (51) which concentrates the slurry to a concentration ranging from 50% to 80% in volume. The concentrated solids are then sent to a substitution reactor (52). The liquid stream that exits the hydrocyclone is pressurized using a centrifugal pump (50) to counterbalance the pressure losses during the process and bring the pressure to the same level as the pressure of the water feed stream (44), thus enabling the recycling of both water and the promoter tetrahydrofuran. A stream of pure $CO_2$ is fed to the substitution reactor (52) to promote the substitution of the existing $N_2$ in hydrates formed by $CO_2$. This $CO_2$ stream comes from a recycle from a later stage of the process. The reactor (52) operates at temperature and pressure conditions similar to the hydrator (11), and can be a stirred tank or a hydrator built from the stacking of structure network plates and heat exchanger plates. $N_2$ exits from the top of the substitution reactor and is mixed with the $N_2$ stream from the flash unit (47) and goes into the turbine (48). The hydrate stream that exits the reactor (52) is heated in a shell-and-tube heat exchanger (54), for temperatures larger than the equilibrium temperature of the formation of $CO_2$ hydrates at the operating pressure (FIG. 1—curve 2), ranging from 10° C. to 15° C. In an alternative embodiment, the heating is done in the dissociation reactor 55. In a further alternative embodiment, the dissociation may be accomplished by pressure reduction. The hydrate dissociation occurs in the unit (55), which can be a stirred tank or a hydrator built from the stacking of structure network plates and heat exchanger plates. An aqueous stream composed essentially of water and tetrahydrofuran exits from the bottom of unit (55). This aqueous stream is recycled, passing through a pump to offset the pressure losses and then mixed with the aqueous stream (44) to be re-introduced into the hydrator (11). This dissociation step is only required for recycling tetrahydrofuran that was not consumed during the process. From the top of unit (55) exits a pure stream of $CO_2$ which is split into two streams. One of these streams is pressurized and then fed to the substitution reactor (52) as stated above. The remaining goes into a compressor and is allowed to come into contact with a cooled and pressurized aqueous stream. The hydrate formation process, now without $N_2$, is repeated according to the method disclosed, and under the same conditions as in Example 1.

Example 3: Experimental Continuous $CO_2$ Hydrates Production

In an embodiment, we show the continuous $CO_2$ hydrates production. Proof of concept of the continuous production of pure $CO_2$ hydrate crystals was made using the method disclosed in the present disclosure. Gaseous pure $CO_2$ from pressurized cylinder and tap water are fed to a hydrator comprising three structured network plates and 4 heat exchange plates. Two closing plates and two additional distribution plates are also included in the hydrator. Prior to their entry in the hydrator, aqueous stream is pressurized using a pump and cooled to about 3-4° C. using a heat exchanger. Inlet flow rates were set to 1 kg·h$^{-1}$ and 10 kg·h$^{-1}$, for the gaseous and aqueous stream respectively, resulting in a gas-liquid mass flow rate ratio of 10%, and a Reynolds number of approximately 200. An aqueous ethanol mixture is flowing in counter-current in the heat exchange plates, entering in the hydrator at a temperature of about 0° C. The temperature at the outlet of the structured network plates stabilized at 5° C. and the pressure is set to 30 bar using a back-pressure valve downstream the hydrator, well within the region of stability of $CO_2$ hydrates (FIG. 1). The contact time in the hydrator of the present example is 1-3 seconds. Immediately after contacting gaseous and aqueous stream in the hydrator, and aqueous slurry of hydrates exit said hydrator.

It is evident from the above description and exemplification that the method of the present invention substantially reduces process times when compared to state-of-the art methods, using smaller hydrator. The present invention provides greater process control of gaseous and aqueous temperature, pressure and heat transfer rates. Greater control results in larger productivities and greater gas conversion. The resultant hydrates have no ice in its structure, maximizing the amount of gas enclathred in the lattice cages.

The $CO_2$ hydrates resultant from the application of the present invention were isolated using a filtration device, washed with pure $CO_2$ and characterized through X-Ray diffraction technique, using a Rigaku Smartlab. The diffractograms (FIG. 6) were obtained with Cu-K$\alpha$ source (wavelength of 1.5406 Å), at a temperature of 263 K, and diffraction angles $15° \leq 2\theta \leq 40°$. The pattern from the real sample (61) can be compared with the simulated pattern (63). The sample contains only cubic structure I material in their structure, and no presence of ice is detected. The pattern (62) represents the difference between the experimental and the simulated data.

Figure 7:
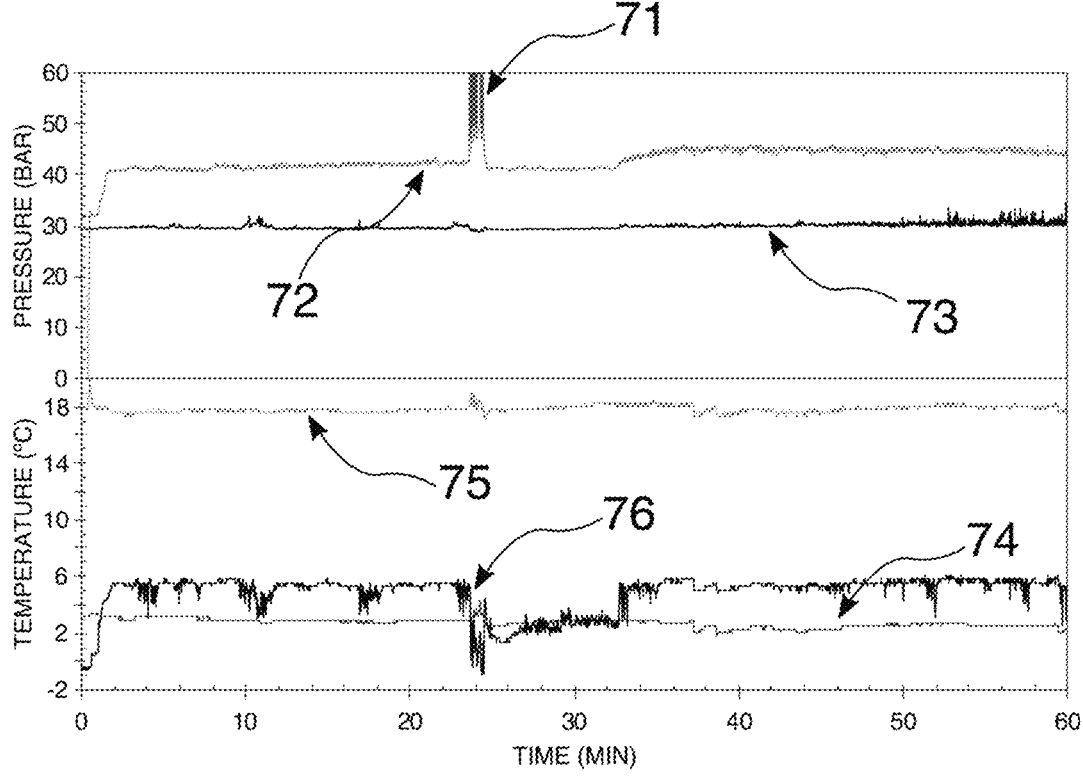
FIG. 7 shows experimental evidence obtained from the example temperature and pressure plots.

In an embodiment, experimental pressure and temperature data are presented in FIG. 7 to demonstrate the process variables stability using the method of the present invention. The pressure at the inlet of the hydrator of the aqueous (71) and gaseous (72) streams have similar behaviour, which is a characteristic of the use of network plates. The pressure at the outlet of the hydrator (73) is lower and is set through the back-pressure regulator to about 30 bar. Temperature at the inlet of the hydrator of the aqueous (74) and gaseous (75) streams are also shown. Temperature of the gas (75) is greater than temperature of water (74). Gaseous stream may or may not be cooled prior to enter the hydrator. In this specific example, gaseous stream was not cooled. The aqueous stream needs to be cooled to temperatures ranging from 2° C. to 5° C. The outlet stream temperature (76) is slightly larger, but not large enough to inhibit the production of hydrates. Furthermore, the temperature increase at the outlet is a prove that hydrates are being formed in a continuous way.

Figure 6:
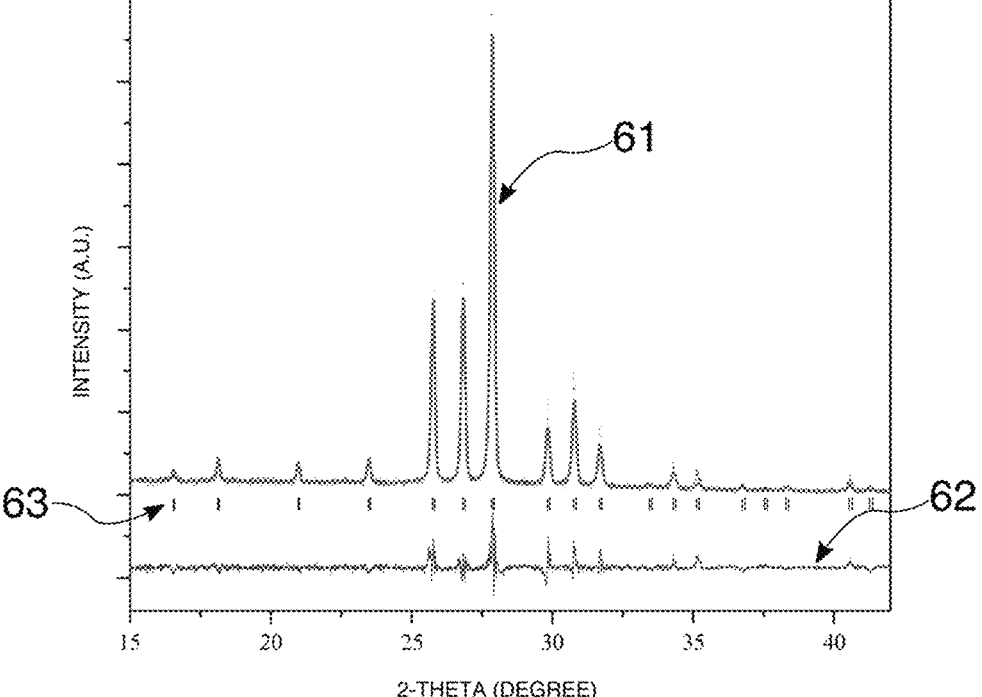
FIG. 6 shows the X-ray diffraction patterns—XRD—of carbon dioxide hydrates obtained with the method disclosed.

In an embodiment, FIG. 6 shows that crystalline $CO_2$ hydrate form has any one or more of the following: an XRD pattern comprising peaks at diffraction angles $(2\theta)$ of $18.2° \pm 0.5\%$, $29.9° \pm 0.5\%$, $30.8° \pm 0.5\%$ and $31.7° \pm 0.5\%$. Additionally, the absence of these ice peaks in the XRD pattern of FIG. 6 clearly demonstrates that the hydrates obtained by the method of the present disclosure are absence of hexagonal ice.

The above described embodiments are combinable.

The term "comprising" whenever used in this document is intended to indicate the presence of stated features, integers, steps, components, but not to preclude the presence or addition of one or more other features, integers, steps, components or groups thereof.

The invention claimed is:

1. A method for producing clathrate hydrates in a continuous process, the process comprising:
   lowering the temperature of an aqueous solution stream to a pre-defined temperature range;
   introducing the aqueous solution stream into a hydrator via a first inlet;
   introducing a stream of at least one hydrate-forming compound into the hydrator via a second inlet;

contacting the hydrate-forming stream and the aqueous stream inside a mixing element of the hydrator to produce an aqueous slurry of clathrate hydrates, wherein the hydrator operates at a temperature in the range of from 0° C. to 5° C., at a pressure in the range of from 10 to 40 bar, and at a hydrate-forming stream rate in the range of from 1 to 500 ton/h; and collecting the aqueous slurry of clathrate hydrates from an outlet of the hydrator;

wherein the hydrator is an array of static mixing elements comprising a stack of plates (11), delimited by two closing plates (12) for compression, and two heat exchange plates (13) intercalated by one network plate (14);

wherein the closing plates (12) comprises a top closing plate and a bottom closing plate;

wherein the top closing plate comprises inlets (15) for the hydrate-forming stream and the aqueous solution stream, and one or more inlets for a cooling liquid (16);

wherein the bottom closing plate comprises outlet (17) for the flow of aqueous slurry of hydrates, and one or more outlets (18) for the flow of the cooling liquid;

wherein the network plate (14) comprises chambers (21);

wherein each chamber (21) is being interconnected by at least two prismatic channels (22) to at least two other chambers (21);

wherein the heat exchange plate (13) comprises a channel for the flow of the cooling liquid;

wherein the channel of the heat exchange plate (13) and the chambers (21) of the network plate (14) are lined up to transfer heat between said chambers (21) and said channel (22);

wherein the cooling liquid is flowing in co-current with the hydrate-forming and aqueous streams;

wherein the cooling fluid flows inside the heat exchange plates (13) to absorb the heat released by the adjacent network plates (14);

wherein the temperature of the cooling liquid ranges from –5° C. to 0° C.;

wherein the hydrate-forming compound is selected from a list of molecules with molecular radii less than 9 Å comprising: carbon dioxide stream, carbon monoxide stream, hydrogen stream, nitrogen stream, C1-C5 hydrocarbons stream, hydrogen sulphide stream, or mixtures thereof.

2. The method of claim 1, wherein the hydrate-forming stream is converted to the aqueous slurry of hydrates at a hydrate conversion rate of at least 80%.

3. The method of claim 2, wherein the hydrate conversion rate is at least 90%.

4. The method of claim 1, wherein the clathrate hydrates in the aqueous slurry of clathrate hydrates are crystalline compounds, the method further comprising concentrating the clathrate hydrate crystals.

5. The method of claim 4 wherein the hydrator operates at a temperature in the range of from 2-5° C.

6. The method of claim 1 wherein the hydrator operates at a pressure in the range of from 20 to 40 bar.

7. The method of claim 1 wherein the aqueous solution stream and the hydrate-forming stream are introduced into one or more static mixing elements of the hydrator through high energy jets that enhance the mixing intensity of the hydrate-forming stream and the aqueous stream inside the one or more chambers.

8. The method of claim 1 wherein the hydrate-forming stream is introduced into the hydrator at a hydrate-forming-stream-to-water mass flow rate of at least 5%.

9. The method of claim 1 wherein the first and second inlets of the hydrator introduce the hydrate-forming stream and the aqueous stream into a chamber of the hydrator with an energy characterized in a Reynolds number of at least 100, and further wherein the contacting step inside the mixing element takes place over a time period of less than or equal to 1 second.

10. The method of claim 1 wherein a heat transfer coefficients of the hydrator is in the range of from 1000 to 8000 $W \cdot m^{-2} \cdot K^{-1}$.

11. The method of claim 1 wherein the C1-C5 hydrocarbons stream is methane, ethane, propane, or butane.

12. The method of claim 1, wherein the clathrate hydrates in the aqueous slurry of clathrate hydrates are crystalline compounds, the method further comprising gasifying the clathrate hydrate crystals.

13. The method of claim 1 wherein the aqueous solution stream contains salts, gases, organic promoters, or mixtures thereof.

* * * * *